United States Patent
Price et al.

(10) Patent No.: US 9,723,315 B2
(45) Date of Patent: Aug. 1, 2017

(54) FRAME ENCODING SELECTION BASED ON FRAME SIMILARITIES AND VISUAL QUALITY AND INTERESTS

(75) Inventors: Douglas Scott Price, San Jose, CA (US); Xiaosong Zhou, Campbell, CA (US); Hsi-Jung Wu, San Jose, CA (US)

(73) Assignee: APPLE INC., Cupertino, CA (US)

(*) Notice: Subject to any disclaimer, the term of this patent is extended or adjusted under 35 U.S.C. 154(b) by 1135 days.

(21) Appl. No.: 13/443,745

(22) Filed: Apr. 10, 2012

(65) Prior Publication Data
US 2013/0003846 A1 Jan. 3, 2013

Related U.S. Application Data

(60) Provisional application No. 61/503,795, filed on Jul. 1, 2011.

(51) Int. Cl.
| | |
|---|---|
| H04N 7/28 | (2006.01) |
| H04N 7/32 | (2006.01) |
| H04N 7/26 | (2006.01) |
| H04N 19/154 | (2014.01) |
| H04N 19/172 | (2014.01) |
| H04N 19/132 | (2014.01) |
| H04N 19/14 | (2014.01) |
| H04N 19/137 | (2014.01) |

(52) U.S. Cl.
CPC ......... *H04N 19/154* (2014.11); *H04N 19/132* (2014.11); *H04N 19/137* (2014.11); *H04N 19/14* (2014.11); *H04N 19/172* (2014.11)

(58) Field of Classification Search
None
See application file for complete search history.

(56) References Cited

U.S. PATENT DOCUMENTS

| | | | |
|---|---|---|---|
| 6,370,195 B1 | 4/2002 | Watanabe et al. | |
| 6,526,097 B1 * | 2/2003 | Sethuraman et al. | 375/240.2 |
| 7,526,028 B2 | 4/2009 | Sung et al. | |
| 7,558,320 B2 * | 7/2009 | Winder et al. | 375/240.12 |

(Continued)

FOREIGN PATENT DOCUMENTS

| | | |
|---|---|---|
| CN | 102113329 A | 6/2011 |
| JP | 2001-333429 A | 11/2001 |
| JP | 2005-341601 A | 12/2005 |

OTHER PUBLICATIONS

International Search Report, dated Oct. 11, 2012, from corresponding International Application No. PCT/US/2012/045032, filed Jun. 29, 2012.

(Continued)

*Primary Examiner* — Mohammad J Rahman
(74) *Attorney, Agent, or Firm* — Baker Hostetler LLP; Robert L. Hails (57) ABSTRACT

A system an method for determining to select frames from a video sequence that have high visual appeal and can be coded at high quality when frame rates of coded video drop to such low levels that perceptual sensations of moving video are lost. A metric is derived from a candidate input frame, and such metric is used to determine whether to increase or decrease a weight accorded to the candidate input frame. In an embodiment, the metric may be the auto-exposure data associated with the candidate input frame.

48 Claims, 5 Drawing Sheets

(56) References Cited

U.S. PATENT DOCUMENTS

| | | | |
|---|---|---|---|
| 7,613,382 B2* | 11/2009 | Takahashi et al. | 386/328 |
| 8,175,147 B1* | 5/2012 | Webb et al. | 375/240.03 |
| 2002/0012398 A1* | 1/2002 | Zhou et al. | 375/240.25 |
| 2005/0103857 A1* | 5/2005 | Zhu | G06K 7/10732 235/462.22 |
| 2005/0111009 A1* | 5/2005 | Keightley et al. | 356/602 |
| 2005/0152447 A1 | 7/2005 | Jouppi et al. | |
| 2007/0041657 A1 | 2/2007 | Rychagov et al. | |
| 2008/0008250 A1 | 1/2008 | Mori et al. | |
| 2008/0079818 A1* | 4/2008 | Takahashi et al. | 348/222.1 |
| 2008/0316365 A1 | 12/2008 | Choi et al. | |
| 2009/0322865 A1* | 12/2009 | Wang et al. | 348/68 |
| 2010/0027663 A1 | 2/2010 | Dai et al. | |
| 2011/0109753 A1* | 5/2011 | Srinivasamurthy et al. | 348/208.4 |
| 2011/0273565 A1* | 11/2011 | Muramatsu et al. | 348/148 |
| 2011/0292997 A1* | 12/2011 | An et al. | 375/240.03 |
| 2012/0106328 A1* | 5/2012 | Gan et al. | 370/230 |
| 2012/0169842 A1* | 7/2012 | Chuang et al. | 348/39 |
| 2014/0044372 A1* | 2/2014 | Mertens | H04N 19/46 382/248 |

OTHER PUBLICATIONS

Hsu et al., "Arbitrary Frame Rate Transcoding Through Temporal and Spatial Complexity," IEEE Transactions on Broadcasting, vol. 55, No. 4, pp. 767-775, Dec. 1, 2009.

Nam et al.,"Perceptual Quality-Complexity Optimized Video Playback on Handlheld Devices," 2010 Digest of Technical Papers, International Conference on Consumer Electronics (ICCE), IEEE, pp. 509-510, Jan. 9, 2010.

Korean Office Action, issued Apr. 6, 2015, from corresponding Korean Patent Application No. 10-2013-7034938, filed Dec. 30, 2013.

* cited by examiner

FRAME ENCODING SELECTION BASED ON FRAME SIMILARITIES AND VISUAL QUALITY AND INTERESTS

CROSS REFERENCE TO RELATED APPLICATIONS

This application claims the benefit of priority to previously filed U.S. provisional patent application Ser. No. 61/503,795, filed Jul. 1, 2011, entitled FRAME ENCODING SELECTION BASED ON FRAME SIMILARITIES AND VISUAL QUALITY AND INTERESTS. That provisional application is hereby incorporated by reference in its entirety.

BACKGROUND

Aspects of the present invention relate generally to the field of video processing, and more specifically to a predictive video coding system.

Video display systems impart a sense of moving video when multiple images are displayed at a rate of 10 frames/second (fps) or more. Video coding systems attempt to convey motion by coding a video sequence and transmitting it over a bandwidth-limited channel. Channel bandwidth can vary in many systems, however, without warning. Video coding systems dynamically alter parameters of the video sequence (quantization parameter, coding modes, frame size and frame rate) to fit the coded video data to the bandwidth provided by the channel. Video coding protocols are lossy processes and, therefore, some coding parameters can lower the perceptual quality of the recovered video.

In some cases, however, bandwidth restrictions become so severe that an encoder must drop the frame rate to a level that the recovered video ceases to be perceived as "moving" video. At 1-3 fps, for example, recovered video likely is perceived as a series of still images (analogous to a slide show effect) rather than moving video. Consumers perceive the quality of coded sequences to be particularly bad when visually unappealing images—blurred images, under-exposed images, etc.—are displayed at a terminal for a prolonged period of time. The inventors, therefore, perceive a need in the art for a coding control scheme that, during severe bandwidth restrictions, selects high quality images for coding.

BRIEF DESCRIPTION OF THE DRAWINGS

FIGS. 2(a) and (b) illustrate a coding operation where a video coder selects reference frames based on temporal data according to an embodiment of the present invention.

FIGS. 4(a) and (b) illustrate a method for selecting reference frames based on spatial complexity data according to an embodiment of the present invention.

DETAILED DESCRIPTION

Embodiments of the present invention provide techniques for determining when frame rates of coded video drop to such low levels that perceptual sensations of moving video are lost and, when such frame rates are in use, to select frames from a video sequence that have high visual appeal and can be coded at high quality. Such frames are selected for coding over other frames with lower appeal and/or quality.

FIG. 1(a) is a simplified block diagram illustrating a video coding system 100 according to an embodiment of the present invention. As shown, the system 100 may include a plurality of terminals 110, 120 interconnected via a network 130. The terminals 110, 120 each may capture video data at a local location and code the video data for transmission to the other terminal via the network 130. Each terminal 110, 120 may receive the coded video data of the other terminal from the network 130, reconstruct the coded data and display video data recovered therefrom.

In FIG. 1(a), the terminals 110, 120 are illustrated as smart phones but the principles of the present invention are not so limited. Embodiments of the present invention find application with personal computers (both desktop and laptop computers), tablet computers, computer servers, media players and/or dedicated video conferencing equipment.

The network 130 represents any number of networks that convey coded video data between the terminals 110, 120, including for example wireline and/or wireless communication networks. The communication network 130 may exchange data in circuit-switched or packet-switched channels. Representative networks include telecommunications networks, local area networks, wide area networks and/or the Internet. For the purposes of the present discussion, the architecture and topology of the network 130 are immaterial to the operation of the present invention unless explained hereinbelow.

FIG. 1(b) is a simplified block diagram illustrating components of a terminal 110 according to an embodiment of the present invention. The terminal 110 may include a video coder 140, a camera 150, a motion sensor 160, and a face detector 170. The camera 150 may capture images at the terminal 110. The camera 150 may include a variety of control elements, including an auto-exposure control 155 (shown separately in FIG. 1(b)). The video coder 140 may perform coding processes to compress video data input to it from the camera 150. The motion sensor 160, such as a gyroscope or accelerometer, may detect movement of the terminal 110. The face detector 170 may analyze frames output by the camera 150 and may determine whether human faces are visible in the frame content.

As illustrated in FIG. 1(b), the video coder 140 may include several functional modules, including a frame buffer 141, a pre-processor 142, a coding engine 143, a reference picture cache 144, a transmitter 145, and a controller 146. The frame buffer 141 may store frames output by the camera 150 prior to being coded. These frames may be discarded from the buffer 141 in various modes of operation to tailor a frame rate of the video sequence to coding constraints under which the video coder 140 must operate, including available bit rate.

The pre-processor 142 may perform various analytical and signal conditioning operations on video data stored in the buffer 141. For example, the pre-processor 142 may apply various filtering operations to the frame data to improve efficiency of coding operations applied by the coding engine 143. The coding engine 143 may code the input video data by exploiting temporal and spatial redundancies in the video data. Typically, the coding engine 143 codes the input video data by motion compensated predictive coding, which involves searching throughout a reference picture cache 144 to find data that provides a good prediction reference for an input frame. The reference picture cache 144 may store reconstructed reference frame data. As part of its operation, the coding engine 143 may designate certain frames to be "reference frames," which can serve as prediction references for later-received video data. The coding engine 143 may also include functionality (not shown) to decode coded data of reference frames and store the reconstructed data in the reference picture cache 144. The transmitter 145 may buffer coded video data from the coding engine 143 and may prepare the data for transmission to the terminal 120 via the channel 131. The controller 146 may manage operations of the video coder 140.

The motion sensor 160 may detect movement of the terminal 110 during video capture. The motion sensor 160 may be embodied as an accelerator, a gyroscope or a similar sensor.

The face detector 170, as its name implies, is a functional unit that analyzes video content and determines whether a human face can be detected within the video. Face detectors typically output data representing coordinates of any detected face(s) within each frame and perhaps a confidence score representing an estimated likelihood that a face detection is correct.

The face detector 170 also may output metadata identifying characteristics of the detected face, for example, whether the face is smiling, whether the eyes are detected as open, etc.

The terminal 120 may include functional blocks (not shown) that invert processing operations performed by terminal 110. Thus, the terminal 120 may include a receiver to receive coded data from the channel and a decoder to invert coding operations performed by the video coder. The decoder may generate recovered video suitable for display or a display device of the terminal 120.

To support bidirectional communication, the terminal 120 may include its own functional blocks (not shown) corresponding to the camera, video coder 140, motion sensor 160 and face detector 170. In such an embodiment, the terminal 120 may capture video of a local environment and code it for delivery to terminal 110. The terminal 110 may include its own receiver and decoder to recover video from coded video transmitted by terminal 120. Again, these functional units are not shown merely for convenience.

Figure 2:
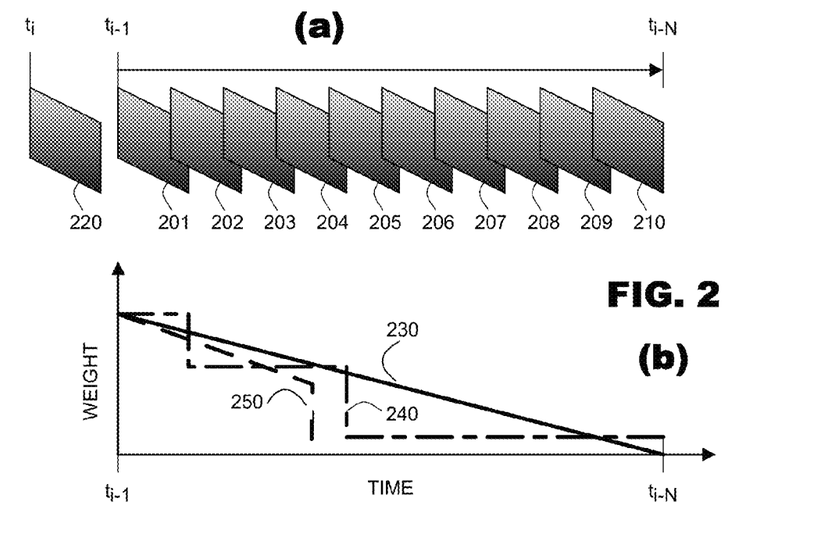

In one embodiment of the present invention, video coders' searches for prediction references may emphasize reference frames that are temporally closest to the frame being coded. FIGS. 2(*a*) and (*b*) illustrates a coding operation where a video coder selects reference frames based on temporal data according to an embodiment of the present invention.

FIG. 2(*a*) illustrates a coding operation where a video coder stores N reference frames 201-210 in a reference picture cache. These reference frames are available for use as prediction references for a new frame 220 being input to the video coder. Prediction references may be assigned on a pixel block-by-pixel block basis. That is, the input frame may be parsed into a plurality of pixel blocks and then each pixel block may be compared with co-located data of each reference frame to identify one or more reference frame pixel blocks that match the pixel block from the input frame. Motion estimation searches may search across spatial regions of each pixel block to find a matching prediction reference. As the video coder compares the input pixel block to each of the reference frames, it may determine a degree of similarity representing the quality of a match between the input pixel block and the corresponding reference frame.

FIG. 2(*b*) illustrates exemplary weighting functions 230, 240 that may be applied to the similarity measures developed from the prediction reference searches. Weighting function 230 is a linear function that transitions linearly from a maximum value for the reference frame 201 temporally closest to the input frame 220 to a minimum value for the reference frame 210 temporally farthest from the input frame. Weighting function 240 is a stepped function that transitions among a plurality of discrete values having a maximum value for the reference frame 201 temporally closest to the input frame 220 to a minimum value for the reference frame 210 temporally farthest from the input frame. In another embodiment, a weighting function 250 may be set to zero for reference frames that are temporally distant from the input reference frame by more than a predetermined amount. The weighting functions illustrated in FIG. 2(*b*) are merely exemplary; the present invention accommodates any number of weighting functions (exponentially decreasing functions, asymptotically decreasing functions, etc.) as may be desired.

During operation, similarity measures developed during a reference prediction search may be scaled by the weighting function associated with the respective reference frame. Using weighting function 230, for example, if an input pixel block generates the same similarity measure with reference frame 202 and reference frame 208, the higher weighting applied to reference frame 202 may cause it to be selected preferentially over reference frame 208. However, if a similarity measure from reference frame 208 is so high that its value exceeds the similarity measure of reference frame 202 after both are scaled, then reference frame 208 may be selected as a prediction reference for the input pixel block.

During operation, similarity measures may be generated by frame differences—a determination of differences between an input pixel block and co-located data of the reference frames. Alternatively, similarity measures may be generated by a motion estimation search or locations of detected faces from a face detector.

It is expected that emphasizing reference frames that are temporally closer to the frame being coded will lead to reduced entropy when the input frame is coded and, therefore, will contribute to higher visual quality when the coded frame is reconstructed at a decoder.

In another embodiment, selection of input frames to be coded may be performed to reduce jitter during video reconstruction and playback at a decoder. Although the slide show mode tends to drop frame rates to a level where perception of moving video is lost, the perceived quality of reconstructed images may be retained if jitter can be minimized in the reconstructed images. A video coder may estimate an amount of jitter associated with each buffered frame and assign a weight to the frame based on the estimated jitter.

Figure 3:
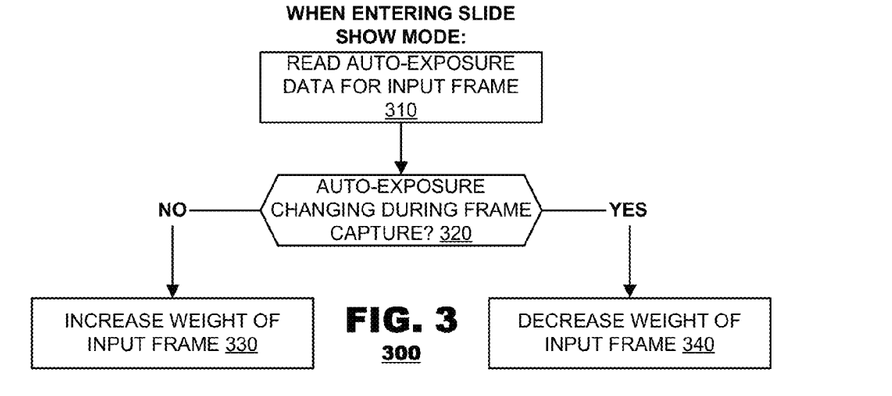
FIG. 3 is a simplified flow diagram illustrating a method for selecting reference frames based on auto-exposure data according to an embodiment of the present invention.

A video coder may select a frame to be coded based on metrics that distinguish frames as having good image quality. FIG. 3 is a simplified flow diagram illustrating a method 300 for selecting reference frames based on auto-exposure data according to an embodiment of the present invention. In FIG. 3, the video coder may use auto-exposure (AE) controls as one such metric. Many camera systems employ algorithms that dynamically adjust exposure settings within the camera in response to varying brightness within a video sequence.

At block 310, the method 300 may read AE settings data for an input frame that is a candidate to be coded. Then, at block 320, the method 300 may determine whether or not AE settings were changing when the input frame was captured by the camera. If the AE settings are not changing, at block 330, the method 300 may increase a weight accorded to the input frame. If the AE settings were changing, at block 340, the method 300 may decrease a weight accorded to the input frame.

Typically, a camera changes its AE settings in response to brightness variations within a video sequence. Frames captured as the AE settings were changing may have poor image quality because they are overexposed or underexposed. In contrast, frames captured when AE settings are stable may have better image quality because the camera is operating using AE settings that are appropriate for the brightness of a captured image.

In another embodiment, the method may examine differences in exposure between a previously-coded frame and buffered input frames that are available for coding. Buffered frames that have exposure settings that are similar to the previously-coded frames may be assigned higher weightings than other buffered frames that have different exposure settings.

In a further embodiment, the method may estimate luminance of each buffered frame and, if a face is detected within the frames, luminance of the face. The method may increase the weighting of frames in which faces are detected and in which the faces are determined to be well-exposed. The method may decrease the weights of frames in which faces are detected but determined to be under-exposed or overexposed.

Figure 4:
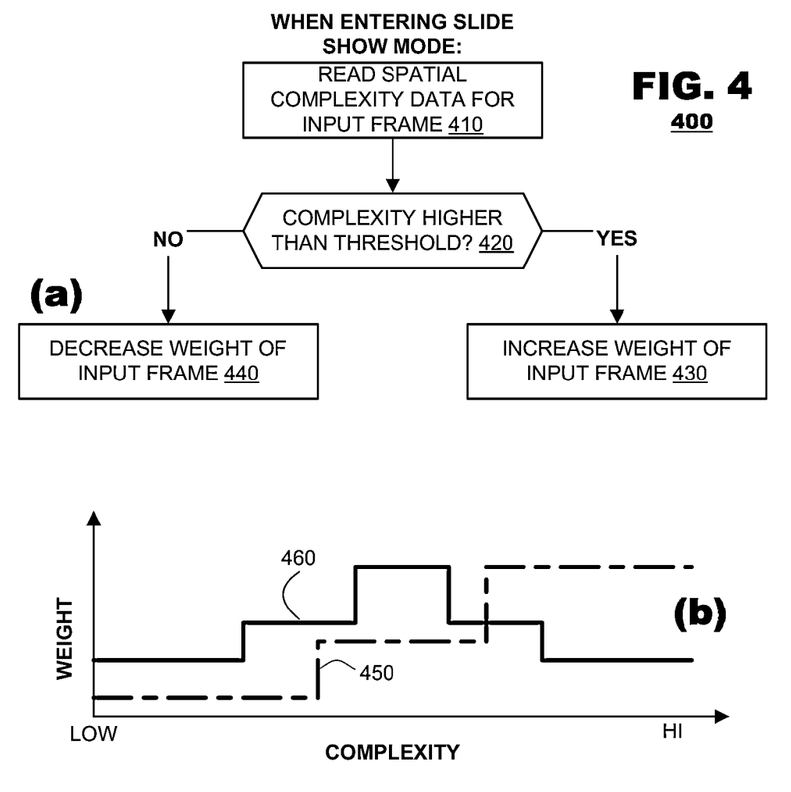

FIGS. 4(a) and (b) illustrate a method for selecting reference frames based on spatial complexity data according to an embodiment of the present invention. FIG. 4(a) is a flow diagram illustrating a method 400 for selecting reference frames based on spatial complexity data. Specifically, a video coder may use spatial complexity as a metric to identify which frame(s) that are candidate(s) to be coded have good image quality. The video coder may estimate spatial complexity using pre-processing algorithms.

At block 410, the method 400 may read complexity estimate for an input frame that is a candidate to be coded. Then, at block 420, the method 400 may compare the complexity estimate to a threshold value. If the complexity data exceeds the threshold, at block 430, the method 400 may increase a weight accorded to the input frame. If the complexity data does not exceed the threshold, at block 440, the method 400 may decrease a weight accorded to the input frame.

Spatial complexity may be determined in any number of ways. A pre-processor may perform edge detection within a candidate frame to identify a number of edges within the frame. A pre-processor (alone or in concert with the coding engine) may perform frequency transforms of image data—for example, discrete cosine transforms or wavelet transforms—and determine relative strengths of high frequency components found within the transformed data. From these metrics, the operations of FIG. 4(a) may be performed.

In an embodiment, the spatial complexity data for an input frame may be determined on a relative basis (block 410). Specifically, the spatial complexity data for the candidate input frame may be determined and compared to the spatial complexity data of a previously selected input frame. The resulting delta is then compared to the threshold (block 420) to establish whether the weight of the input frame should be increased or decreased (blocks 430 and 440).

FIG. 4(b) illustrates various weighting functions according to embodiments of the present invention. Typically, images with high spatial complexity are perceived as having high image quality if they can be recovered with sufficient image fidelity at a decoder. Preserving high image quality for complex images can be difficult for a video coding system, however, particularly when available bit rates drop to such low levels that the encoder engages a slide show mode. Accordingly, in one embodiment, as illustrated in graph 450, a weighting function may assign higher weights to frames of higher complexity. In another embodiment, as illustrated in graph 460, another weighting function may assign higher weights to frames of moderate complexity.

In a further embodiment, the method 400 may compare complexity to a plurality of different thresholds representing different degrees of complexity and assign different weights in response to those comparisons. Such thresholds, for example, may correspond to boundaries between different step levels in the graphs 450, 460 of FIG. 4(b). Some complexity values may cause a given input frame to be disqualified as a candidate for coding.

Figure 5:
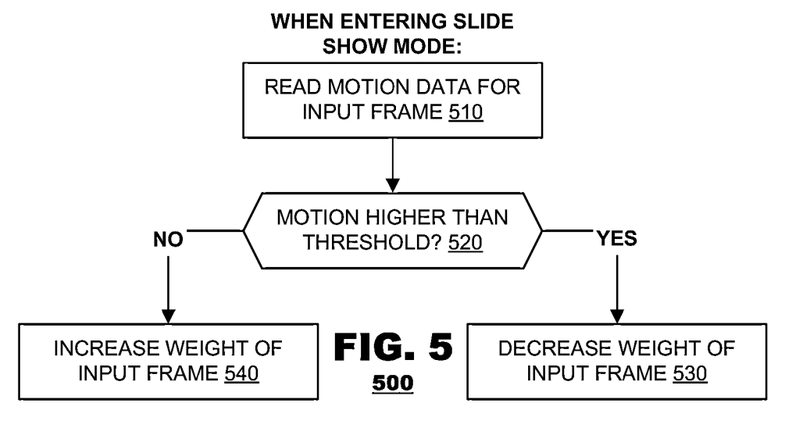
FIG. 5 is a simplified flow diagram illustrating a method for selecting reference frames based on motion data according to an embodiment of the present invention.

FIG. 5 is a simplified flow diagram illustrating a method 500 for selecting reference frames based on motion data according to an embodiment of the present invention. Specifically, a video coder may use motion data as a metric to identify which frame(s) that are candidates to be coded have good image quality. The video coder may derive motion data from the video sequence via a pre-processor or may receive such data from a motion sensor that is engaged with the camera.

At block 510, the method 500 may read motion data for an input frame that is a candidate to be coded. Then, at block 520, the method 500 may compare the motion to a threshold value. If the motion data exceeds the threshold, at block 530, the method 500 may decrease a weight accorded to the input frame. If the complexity data does not exceed the threshold, at block 540, the method 500 may increase a weight accorded to the input frame.

In an embodiment, the motion data for an input frame may be determined on a relative basis (block 510). Specifically, the motion data for the candidate input frame may be determined and compared to the motion data of a previously selected input frame. The resulting delta is then compared to the threshold (block 520) to establish whether the weight of the input frame should be increased or decreased (blocks 530 and 540).

Figure 1:
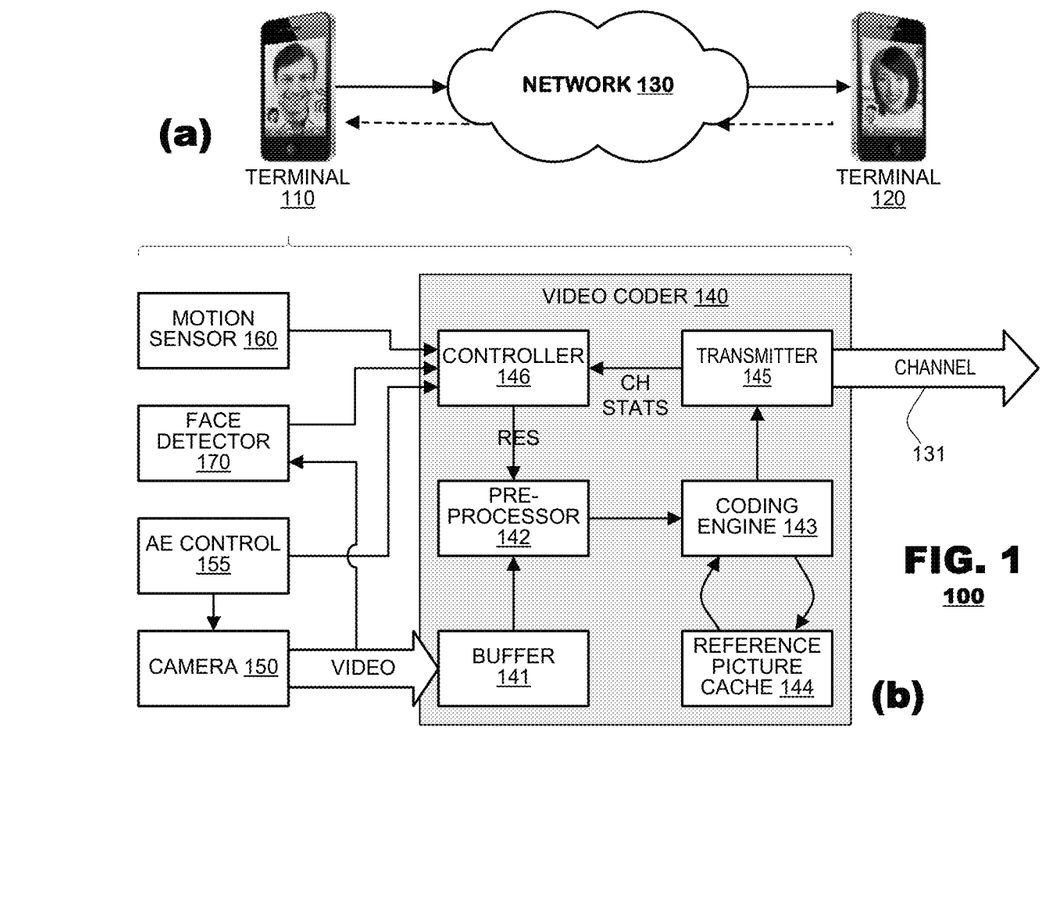
FIG. 1(a) is a simplified block diagram illustrating a video coding system according to an embodiment of the present invention.
FIG. 1(b) is a simplified block diagram illustrating components of a terminal according to an embodiment of the present invention.

As previously discussed, motion data may be generated by a pre-processing algorithm within the video coder. Such algorithms typically estimate global motion of a frame within a larger video sequence by estimation movement of image content therein. Alternatively, motion sensor data, provided for example by a gyroscope or accelerometer within a terminal 110 (FIG. 1) that houses the camera 150 (FIG. 1), may provide such data.

In another embodiment, the motion data may be derived from data output by a face detector 170 (FIG. 1). Face detectors typically provide data representing coordinates of a face when it is detected within a video sequence. In an embodiment, the method may calculate a velocity of the face from the frame-to-frame coordinate data and may assign weights to individual frames based on the calculated velocities.

Typically, images that are captured by a moving camera are likely to exhibit artifacts, such as motion blur or rolling shutter artifacts that diminish perceived image quality. Accordingly, a weighting function may assign higher weights to frames of low motion and lower weights to frames having moderate to high motion.

Figure 6:
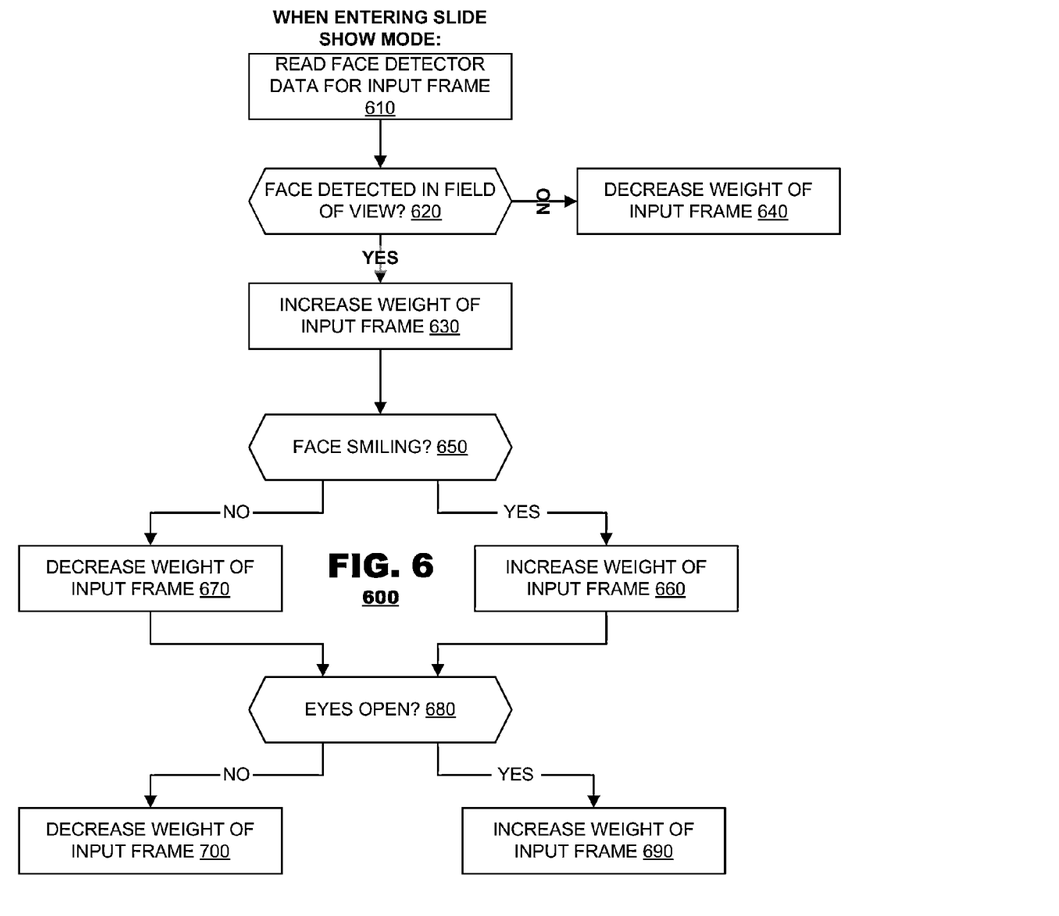
FIG. 6 is a simplified flow diagram illustrating a method for selecting reference frames based on visual interest indicators according to an embodiment of the present invention.

FIG. 6 is a simplified flow diagram illustrating a method 600 for selecting reference frames based on visual interest indicators according to an embodiment of the present invention. Specifically, a video coder may use visual interest indicators as metrics to identify which frame(s) that are candidates to be coded have good visual interest. Face detection algorithms, as the name implies, perform processes to scan frames of a video sequence and determine whether a human face is present in the field of view. When a face detector identifies a face within an image, the detector may output data identifying a location and/or size of the face and ancillary data indicating, for example, whether eyes are open or shut and whether the face is smiling. The video coder may use these indictors to select visually interesting frames for coding.

At block 610, the method 600 may read face detector data for an input frame. Then, at block 620, the method 600 may determine whether a face is detected within a field of view of the input frame. If a face is detected, at block 630, the method 600 may increase a weight associated with the input frame. If a face is not detected, at block 640, the method 600 may decrease a weight associated with the input frame. As a result, the method 600 may emphasize frames having higher visual interest for coding.

Optionally, at block 650, for frames where faces are detected, the method 600 may be extended to determine whether the face is shown to be smiling. If so, at block 660, the method 600 may increase a weight associated with the input frame. If not, at block 670, the method 600 may decrease a weight associated with the input frame. Furthermore, at block 680, the method 600 may optionally determine whether eyes are detected as open. If so, at block 690, the method 600 may increase a weight associated with the input frame. If not, at block 700, the method 600 may decrease a weight associated with the input frame.

The method 600 may also use other metrics provided by the face detector to adjust weights assigned to each frame. For example, the method 600 may determine the size of the face within the field of view and emphasize frames with larger faces over frames with smaller faces. Additionally, the method 600 may determine the location of the face within the field of view and emphasize frames with faces provided in the center of the field of view over frames with faces provided outside the center of the field of view. Furthermore, the method 600 may determine the location of a face in the candidate input frame and compare it to the location of a face in a previously coded input frame. The method 600 may emphasize frames where the difference in face location is small over frames where the difference in face location is large.

The method 600 may also assign preferential weights to frames in which the face is detected to be within an auto-exposure (AE) metering zone. For example, many auto-exposure control algorithms develop AE control based on image content within the center of a field of view. Frames that identify faces within the AE control zone may have increased weights assigned to them and frames that identify faces outside the AE control zone may have lower weights assigned to them.

Consider an example where a coding frame rate allows only 1 out of every 10 frames to be coded. In this case, the video coder would drop 9 out of 10 frames, yielding a default pattern of 10, 20, 30, 40, 50, etc. In some circumstances, however, due to coding quality considerations, a video coder may select frame 15 for coding after frame 10 is coded. Jitter may be minimized in this example, by building a new frame pattern from frame 15. Thus, frame 25 would get the highest weighting for the next selection decision, not frame 30. The weightings may be based on an estimate of which frames produce the least amount of jitter during playback which is not always driven the distance from the original frame that would have been coded.

Figure 7:
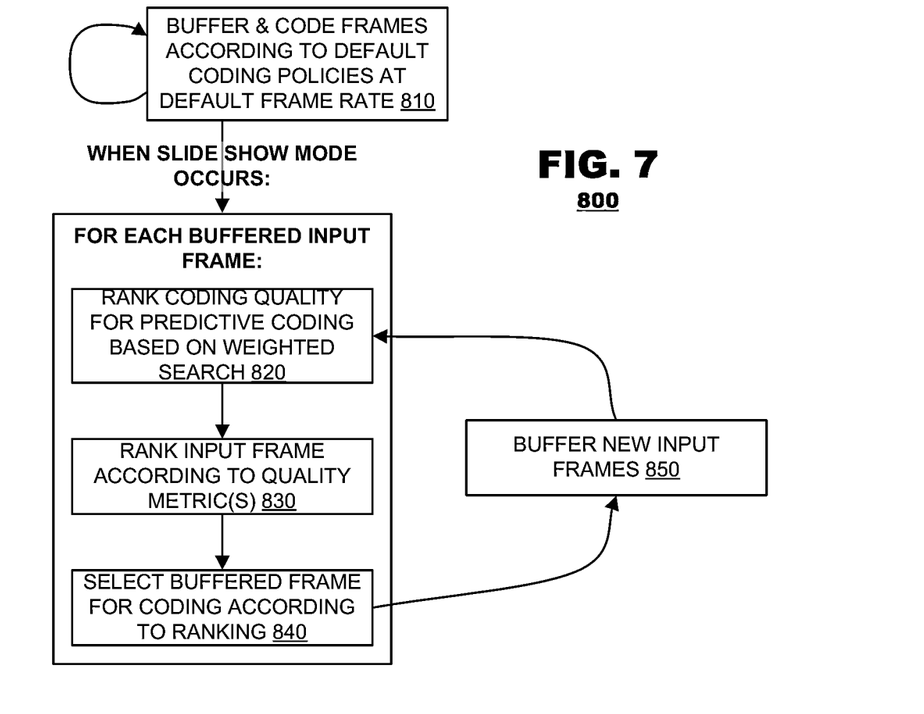
FIG. 7 is a simplified flow diagram illustrating a method when a video coder is in a slide show mode according to an embodiment of the present invention.

FIG. 7 is a simplified flow diagram illustrating a method 800 when a video coder is in a slide show mode according to an embodiment of the present invention.

At block 810, a video coder initially may operate in a normal runtime mode in which case it buffers and codes input video data according to a set of default coding policies, which involves a default frame rate. Then, at some point in operation, the video coder may enter the slide show mode at which point the frame rate drops to a level where frames cannot be coded at a high enough rate to convey a sense of motion at playback. Typically, this rate is 1-3 fps. When the video coder enters slide show mode, it may evaluate each of the input frames contained in its frame buffer as a candidate for coding. Specifically, the video coder may, at block 820, rank coding quality that can be achieved for the input frame based on a weighted search, for example, according to the search method described in FIG. 2. Thereafter, at block 830, the video coder may rank coding quality that can be achieved for the input frame based on quality metrics for the frame, for example, according to one or more of the techniques described in FIGS. 3-6. Finally, at block 840, the video coder may select and code one of the buffered frames according to the rankings derived at boxes 820-830. Typically, this involves selecting the highest ranked frame.

While the video coder is operating in slide show mode, at block 850, the method 800 may continue to buffer new frames captured by the camera and repeat operation of boxes 820-840 at the slide show frame rate until the video sequence concludes or the video coder exits the slide show mode.

The video coder may select buffered frames for coding based on "judder," which is the consistency of the temporal spacing between frames. If the current frame-rate is a particular number of frames per second, for example, 1 frame per second, then the video coder may select frames for coding such that each selected frame for coding is approximately 1 second apart from the previously selected frame for coding.

The video coder may also select buffered frames for coding by performing a simple weighted sum of absolute differences between pixels of candidate buffered frames and a previously coded frame with extra weighting on the face area. Such selections may lead to highly efficient coding.

The foregoing discussion identifies functional blocks that may be used in video coding systems constructed according to various embodiments of the present invention. In practice, these systems may be applied in a variety of devices, such as mobile devices provided with integrated video cameras (e.g., camera-enabled phones, entertainment systems and computers) and/or wired communication systems such as videoconferencing equipment and camera-enabled desktop computers. In some applications, the functional blocks described hereinabove may be provided as elements of an integrated software system, in which the blocks may be provided as separate elements of a computer program. In other applications, the functional blocks may be provided as discrete circuit components of a processing system, such as functional units within a digital signal processor or application-specific integrated circuit. Still other applications of the present invention may be embodied as a hybrid system of dedicated hardware and software components. Moreover, the functional blocks described herein need not be provided as separate units. For example, although FIG. 1(b) illustrates the components of video coders as separate units, in one or more embodiments, some or all of them may be integrated and they need not be separate units. Such implementation details are immaterial to the operation of the present invention unless otherwise noted above.

Further, the figures illustrated herein have provided only so much detail as necessary to present the subject matter of the present invention. In practice, video coders typically will include functional units in addition to those described herein, including audio processing systems, buffers to store data throughout the coding pipelines as illustrated and communication transceivers to manage communication with the communication network and a counterpart decoder device. Such elements have been omitted from the foregoing discussion for clarity.

While the invention has been described in detail above with reference to some embodiments, variations within the scope and spirit of the invention will be apparent to those of ordinary skill in the art. Thus, the invention should be considered as limited only by the scope of the appended claims.

What is claimed is:

1. A video coding method, comprising, when a coding frame rate drops below a predetermined threshold:
    buffering a plurality of input video frames generated by a camera,
    for each buffered input frame, assigning a weight based on a frame quality metric evaluating a quality of the frame, the frame quality metric being a function of a rate of change of auto-exposure settings of the camera during capture of the frame,
    coding a highest weighted frame of the plurality of buffered input frames, and
    discarding a plurality of lower-weighted frames of the plurality of buffered input frames from the buffer without coding.

2. The video coding method of claim 1, wherein the frame quality metric is derived from exposure changes between each buffered input frame and its preceding frame.

3. The video coding method of claim 1, wherein the frame quality metric is derived from estimated luminance of each buffered input frame.

4. The video coding method of claim 1, wherein the frame quality metric is derived from estimated face detection performed on each buffered input frame.

5. The video coding method of claim 4, wherein the frame quality metric further is derived from estimated luminance of a region of a detected face within each input frame.

6. The video coding method of claim 4, wherein the frame quality metric further is derived from a detected artifact of a face within each input frame.

7. The video coding method of claim 4, wherein the frame quality metric further is derived from a location of a detected face within each input frame.

8. The video coding method of claim 4, wherein the frame quality metric further is derived from a confidence score associated with a detected face within each input frame.

9. The video coding method of claim 6, wherein the artifact is a detected smile.

10. The video coding method of claim 6, wherein the artifact is detection of open eyes.

11. The video coding method of claim 6, wherein the frame quality metric is derived from an estimate of spatial complexity within each buffered input frame.

12. The video coding method of claim 1, wherein the frame quality metric is derived from an estimate of motion of each buffered input frame.

13. The video coding method of claim 1, wherein the frame quality metric is derived from an estimate of jitter associated with each input frame.

14. The video coding method of claim 1, wherein the frame quality metric is derived from an estimate of temporal consistency between each input frame and at least one previously coded frame.

15. The video coding method of claim 1, wherein the coding comprises, for each pixel block of the frame to be coded:
    performing a motion estimation search between the respective pixel block of the frame to be coded and a plurality of locally-stored reference frames,
    for each candidate reference frame identified by the search, determining a similarity measure between the respective pixel block to be coded and a matching pixel block from the respective candidate reference frame,
    scaling the similarity measures according to the candidate reference frames' temporal locations, and
    selecting a matching pixel block as a prediction reference for the pixel block to be coded based on the scaled similarity measures, and coding the input pixel block with reference to the prediction reference.

16. Video coding apparatus, comprising:
    a camera,
    a video coder system, comprising:
        a buffer to store input frames of a video sequence from the camera,
        a coding engine to code selected frames from the buffer according to temporal prediction techniques,
        a reference picture cache to store reconstructed video data of coded reference frames, and
        a controller to control operation of the video coding sequence to, when a coding frame rate drops below a predetermined threshold:
            for each buffered input frame, assign a weight based on a frame quality metric evaluating a quality of the frame, the frame quality metric being a function of a rate of change of auto-exposure settings of the camera during capture of the frame,
            code a highest weighted frame of the plurality of buffered input frames, and
            discard a plurality of lower-weighted frames of the plurality of buffered input frames from the buffer without coding.

17. The apparatus of claim 16, wherein the video coder comprises a pre-processor that estimates exposure of buffered frames and the frame quality metric is derived from exposure changes between each buffered input frame and its preceding frame.

18. The apparatus of claim 16, wherein the video coder comprises a pre-processor that estimates luminance of buffered frames and the frame quality metric is derived from estimated luminance of each buffered input frame.

19. The apparatus of claim 16, further comprising a face detector, wherein the frame quality metric is derived from estimated face detection performed on each buffered input frame.

20. The apparatus of claim 16, wherein the video coder comprises a pre-processor that estimates spatial complexity of buffered frames and the frame quality metric is derived from an estimate of spatial complexity within each buffered input frame.

21. The apparatus of claim 16, further comprising a motion sensor, wherein the frame quality metric is derived from an estimate of motion of each buffered input frame.

22. The apparatus of claim 16, wherein the frame quality metric is derived from an estimate of jitter associated with each input frame.

23. The apparatus of claim 16, wherein the frame quality metric is derived from an estimate of temporal consistency between each input frame and at least one previously coded frame.

24. A non-transitory machine-readable storage medium having stored thereon program instructions which, when executed by a processor perform a method, the method comprising:
buffering in the storage device a plurality of input video frames generated by a camera;
for each buffered input frame, assigning a weight based on a frame quality metric evaluating a quality of the frame, the frame quality metric being a function of a rate of change of auto-exposure settings of the camera during capture of the frame;
coding a highest weighted frame of the plurality of buffered input frames; and
discarding a plurality of lower-weighted frames of the plurality of buffered input frames from the storage device without coding.

25. The non-transitory storage medium of claim 24, wherein the frame quality metric is derived from exposure changes between each buffered input frame and its preceding frame.

26. The non-transitory storage medium of claim 24, wherein the frame quality metric is derived from estimated luminance of each buffered input frame.

27. The non-transitory storage medium of claim 24, wherein the frame quality metric is derived from estimated face detection performed on each buffered input frame.

28. The non-transitory storage medium of claim 27, wherein the frame quality metric further is derived from estimated luminance of a region of a detected face within each input frame.

29. The non-transitory storage medium of claim 27, wherein the frame quality metric further is derived from a detected artifact of a face within each input frame.

30. The non-transitory storage medium of claim 27, wherein the frame quality metric further is derived from a location of a detected face within each input frame.

31. The non-transitory storage medium of claim 27, wherein the frame quality metric further is derived from a confidence score associated with a detected face within each input frame.

32. The non-transitory storage medium of claim 24, wherein the frame quality metric is derived from an estimate of spatial complexity within each buffered input frame.

33. The non-transitory storage medium of claim 24, wherein the frame quality metric is derived from an estimate of motion of each buffered input frame.

34. The non-transitory storage medium of claim 24, wherein the frame quality metric is derived from an estimate of jitter associated with each input frame.

35. The non-transitory storage medium of claim 24, wherein the frame quality metric is derived from an estimate of temporal consistency between each input frame and at least one previously coded frame.

36. The non-transitory storage medium of claim 24, wherein the coding by the processor comprises, coding each pixel block of the frame by:
performing a motion estimation search between the respective pixel block of the frame to be coded and a plurality of locally-stored reference frames,
for each candidate reference frame identified by the search, determining a similarity measure between the respective pixel block to be coded and a matching pixel block from the respective candidate reference frame,
scaling the similarity measures according to the candidate reference frames' temporal locations,
selecting a matching pixel block as a prediction reference for the pixel block to be coded based on the scaled similarity measures, and
coding the input pixel block with reference to the prediction reference.

37. A video coding method comprising, when a coding frame rate drops below a predetermined threshold:
selecting an input frame for coding,
for each pixel block of the input frame:
performing a motion estimation search between the respective pixel block and a plurality of locally-stored reference frames,
for each candidate reference frame identified by the search, determining a similarity measure between the respective pixel block and a matching pixel block from the respective candidate reference frame,
scaling the similarity measures according to the candidate reference frames' temporal locations, and
selecting a matching pixel block as a prediction reference for the input pixel block based on the scaled similarity measures, and
coding the input pixel block with reference to the prediction reference.

38. The method of claim 37, wherein the scaling occurs according to a scaling function that decreases for each buffered reference frame as the temporal distance between the input frame and the buffered reference frame increases.

39. The method of claim 37, wherein the selecting comprises:
assigning weights to each of a plurality of buffered input frames based on a frame quality metric, and
selecting a highest weighted input frame for coding.

40. The method of claim 39, further comprising discarding other lower-weighted input frames from the buffer without coding.

41. The method of claim 39, wherein the frame quality metric is derived from a rate of change of camera auto-exposure settings that occur during capture of each of the buffered input frames.

42. The method of claim 39, wherein the frame quality metric is derived from exposure changes between each buffered input frame and its preceding frame.

43. The method of claim 39, wherein the frame quality metric is derived from estimated luminance of each buffered input frame.

44. The method of claim 39, wherein the frame quality metric is derived from estimated face detection performed on each buffered input frame.

45. The method of claim 39, wherein the frame quality metric is derived from an estimate of spatial complexity within each buffered input frame.

46. The method of claim 39, wherein the frame quality metric is derived from an estimate of motion of each buffered input frame.

47. The method of claim 39, wherein the frame quality metric is derived from an estimate of jitter associated with each input frame.

48. The method of claim 39, wherein the frame quality metric is derived from an estimate of temporal consistency between each input frame and at least one previously coded frame.

\* \* \* \* \*